US011176653B2

(12) United States Patent
Oe et al.

(10) Patent No.: US 11,176,653 B2
(45) Date of Patent: Nov. 16, 2021

(54) SYSTEM AND METHOD FOR SPECIFYING LANE MARKING DETERIORATION

(71) Applicant: TOYOTA JIDOSHA KABUSHIKI KAISHA, Toyota (JP)

(72) Inventors: Yoshihiro Oe, Kawasaki (JP); Kazuya Nishimura, Okazaki (JP); Hirofumi Kamimaru, Fukuoka (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 16/782,626

(22) Filed: Feb. 5, 2020

(65) Prior Publication Data

US 2020/0294221 A1 Sep. 17, 2020

(30) Foreign Application Priority Data

Mar. 15, 2019 (JP) .............................. JP2019-048577

(51) Int. Cl.
*G06T 7/00* (2017.01)
*G06K 9/46* (2006.01)
*G06K 9/00* (2006.01)

(52) U.S. Cl.
CPC ........ *G06T 7/0002* (2013.01); *G06K 9/00798* (2013.01); *G06K 9/46* (2013.01); *G06T 2207/30256* (2013.01)

(58) Field of Classification Search
CPC ....... G06T 7/002; G06K 9/00798; G06K 9/46
See application file for complete search history.

(56) References Cited

U.S. PATENT DOCUMENTS

| 2009/0284597 | A1* | 11/2009 | Nakamori | G06T 7/12 |
| | | | | 348/148 |
| 2010/0001883 | A1* | 1/2010 | Koenig | G08G 1/161 |
| | | | | 340/988 |
| 2017/0344828 | A1* | 11/2017 | Akselrod | G06T 7/0004 |
| 2018/0037230 | A1* | 2/2018 | Otake | B60W 10/06 |
| 2018/0284798 | A1* | 10/2018 | Kita | G06K 9/00798 |
| 2018/0284799 | A1* | 10/2018 | Tokunaga | G05D 1/0234 |
| 2019/0266419 | A1* | 8/2019 | Schack | G06T 7/248 |
| 2020/0285862 | A1* | 9/2020 | Pojman | G06T 7/10 |
| 2020/0294221 | A1* | 9/2020 | Oe | G06K 9/00798 |

FOREIGN PATENT DOCUMENTS

JP 2018-020691 A 2/2018

* cited by examiner

*Primary Examiner* — Md K Talukder
(74) *Attorney, Agent, or Firm* — Oliff PLC

(57) ABSTRACT

In a system for specifying a lane marking deterioration, an image acquiring unit acquires a captured image of an outside of a vehicle. A specifying unit extracts a lane marking on a road surface included in the captured image and specifies a deteriorated portion of the lane marking. The specifying unit specifies the deteriorated portion of the lane marking in comparison with another lane marking included in the captured image. A receiving unit receives past lane marking data of a road included in the captured image. The specifying unit specifies, from the captured image, a deteriorated portion of the lane marking that has deteriorated from the past lane marking data.

5 Claims, 3 Drawing Sheets

SYSTEM AND METHOD FOR SPECIFYING LANE MARKING DETERIORATION

INCORPORATION BY REFERENCE

The disclosure of Japanese Patent Application No. 2019-048577 filed on Mar. 15, 2019 including the specification, drawings and abstract is incorporated herein by reference in its entirety.

BACKGROUND

1. Technical Field

The disclosure relates to a system and a method for specifying a lane marking deterioration.

2. Description of Related Art

Japanese Unexamined Patent Application Publication No. 2018-020691 (JP 2018-020691 A) discloses a vehicle travel control device that automatically stops a vehicle in a safe place when the driver loses the ability to drive the vehicle. The vehicle travel control device recognizes right and left lane marking information on a traveling road from data about a road image captured by an imaging device of the vehicle, determines whether or not the vehicle is in a deceleration prohibition section based on the lane marking information, and prohibits deceleration of the vehicle when the vehicle is in the deceleration prohibition section.

SUMMARY

On a curved road where the speed tends to pick up and the radius is small, it is easy for the vehicle to cross the lane marking and stick out of the road. Since it is considered that such a place is likely to cause an accident, it is preferable to specify the place in advance and notify a driver of the place before the driver passes through the place.

An object of the present disclosure is to provide a technique for specifying a place of a traveling road where it is easy for a vehicle to stick out.

In order to solve the above problems, one aspect of the disclosure provides a system for specifying a lane marking deterioration. The system includes an image acquiring unit and a specifying unit. The image acquiring unit is configured to acquire a captured image of an outside of a vehicle. The specifying unit configured to extract a lane marking on a road surface included in the captured image and specify a deteriorated portion of the lane marking.

Another aspect of the disclosure provides a method for specifying a lane marking deterioration. The method includes acquiring a captured image of an outside of a vehicle, and extracting a lane marking on a road surface included in the captured image and specifying a deteriorated portion of the lane marking.

With the aspects of the present disclosure, it is possible to provide a technique for specifying a place of a traveling road where it is easy for a vehicle to stick out.

BRIEF DESCRIPTION OF THE DRAWINGS

Features, advantages, and technical and industrial significance of exemplary embodiments of will be described below with reference to the accompanying drawings, in which like numerals denote like elements, and wherein.

DETAILED DESCRIPTION OF EMBODIMENTS

Figure 1:
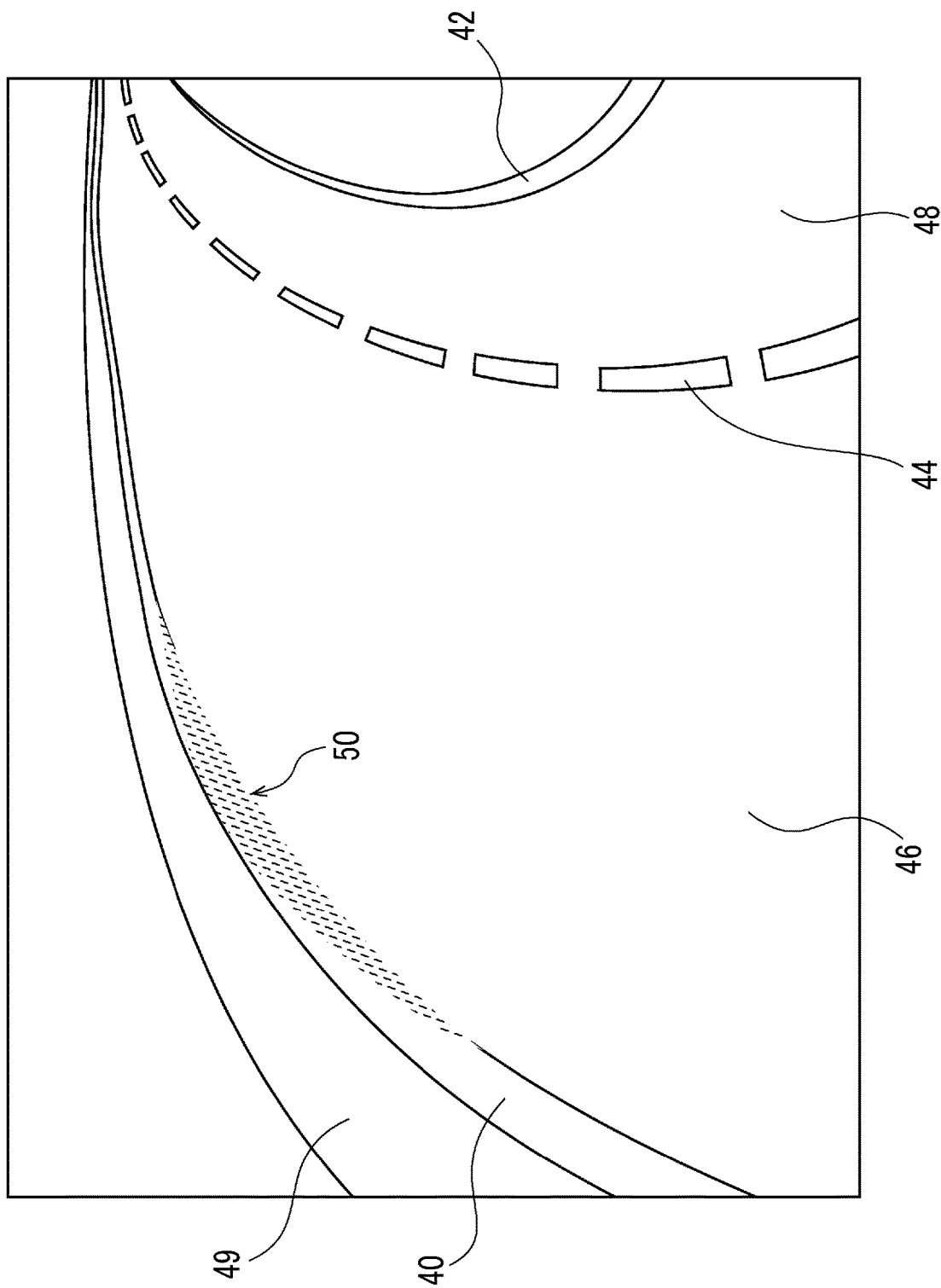
FIG. 1 illustrates a captured image including a lane marking, obtained by imaging the outside of a vehicle.

FIG. 1 illustrates a captured image including a lane marking, obtained by imaging the outside of a vehicle. The road is provided with a first lane marking 40, a central lane marking 44, and a second lane marking 42 to divide the first roadway 46 and the second roadway 48. The first lane marking 40 separates the first roadway 46 and the sidewalk 49. The first lane marking 40 and the second lane marking 42 are provided at the boundary with the sidewalks, and form the outer boundaries of the first roadway 46 and the second roadway 48.

The first lane marking 40, the second lane marking 42, and the central lane marking 44 (when the markings are not distinguished from each other, simply referred to as "lane markings") are formed by adhering paint to the road surface, and deteriorate over time. The markings also deteriorate due to friction with the tires of the traveling vehicle.

In a case where the first roadway 46 is a curved road where the speed tends to pick up and the radius is small and a vehicle is traveling on the first roadway 46, the vehicle is likely to cross the first lane marking 40 and stick out of the first roadway 46. The first lane marking 40 illustrated in FIG. 1 forms an outer boundary of the curved road, and is stepped on by a tire when the vehicle forcefully pulls to one side and sticks out of the first roadway 46. The portion where the tire has been rubbed many times has deteriorated locally, and as illustrated in FIG. 1, the deteriorated portion 50 is formed where the paint is peeled off and thinned on the first lane marking 40.

Since the first lane marking 40, the second lane marking 42, and the central lane marking 44 are painted at the same time, the degree of deterioration over time is the same. Therefore, it is estimated that the locally deteriorated portion 50 in the first lane marking 40 has been deteriorated by being stepped on by tires many times.

The deteriorated portion 50 of the first lane marking 40 is a place where the vehicle is likely to stick out into the sidewalk 49, and is estimated to be a dangerous place for the driver. Further, when the deteriorated portion 50 of the first lane marking 40 becomes too thin, it becomes difficult for the driver to recognize the outer boundary of the first roadway 46, and the possibility that the vehicle sticks out of the first roadway 46 increases. A system for specifying a lane marking deterioration (lane marking deterioration specifying system) according to the embodiment collects information on the deteriorated portion 50 of the first lane marking 40 having such a danger, and uses the collected information to alert the driver and notify the road manager who is responsible for repairing the lane marking.

Figure 2:
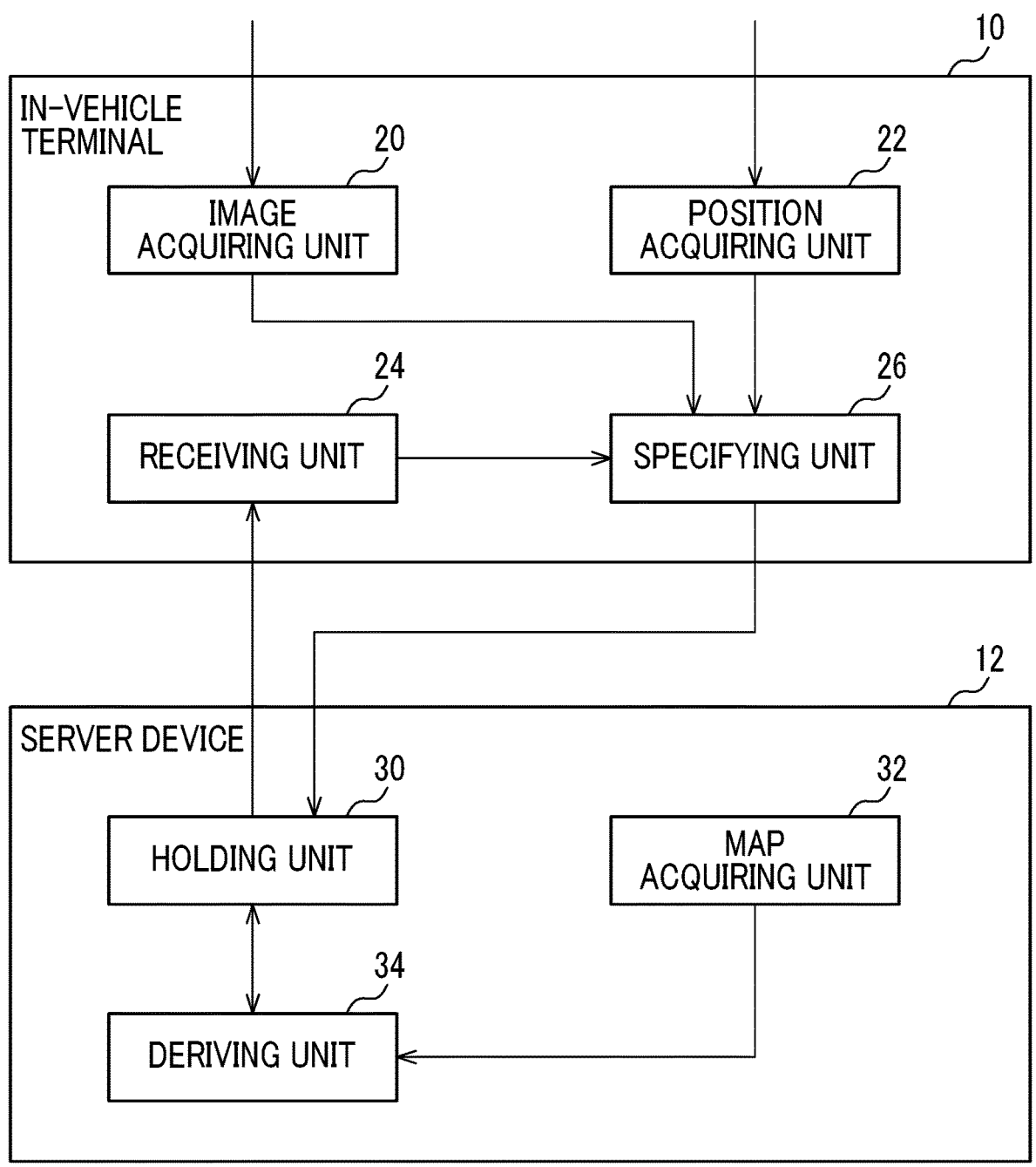
FIG. 2 is a diagram illustrating functional blocks of a lane marking deterioration specifying system according to an embodiment.

FIG. 2 is a diagram illustrating functional blocks of the lane marking deterioration specifying system 1 according to the embodiment. Each function of the lane marking deterioration specifying system 1 can be achieved by a circuit block, a memory, and other LSIs (large-scale integrations) in terms of hardware, and implemented by system software or application programs loaded in the memory in terms of software. Therefore, it is understood by those skilled in the art that each function of the lane marking deterioration specifying system 1 can be achieved in various forms by hardware only, software only, or a combination thereof, and is not limited to either.

The lane marking deterioration specifying system 1 includes a plurality of in-vehicle terminals 10 and a server device 12, and specifies a deteriorated portion of the lane marking. The in-vehicle terminal 10 includes an image acquiring unit 20, a position acquiring unit 22, a receiving unit 24 and a specifying unit 26. The server device 12 includes a holding unit 30, a map acquiring unit 32, and a deriving unit 34.

The in-vehicle terminal 10 and the server device 12 are connected through a network and can transmit and receive information to and from each other. The server device 12 collects information acquired by the plurality of in-vehicle terminals 10 and holds information on the deteriorated portion of the lane marking.

The image acquiring unit 20 of the in-vehicle terminal 10 acquires a captured image, which is captured by the in-vehicle camera and contains the outside of the vehicle, and an acquisition time of the captured image. The captured image contains scenery in front of the vehicle as shown in FIG. 1 and contains the traveling road surface. The position acquiring unit 22 acquires the position information of the vehicle and the acquisition time of the position information by using a global positioning system (GPS).

The specifying unit 26 extracts a lane marking on the road surface included in the captured image, and specifies a deteriorated portion 50 of the lane marking. Since a plurality of lane markings are provided in parallel, even when a part thereof is peeled off, it can be extracted based on other lane markings included in the same captured image. The information on the specified deteriorated portion 50 includes captured position information and its acquisition time. By analyzing the captured image, it is possible to easily specify the deterioration of the lane marking and to specify a dangerous place. For example, in a method for specifying a dangerous curved road where a vehicle is likely to forcefully pull to one side during turning based on behavior information on the vehicle, the behavior information of a plurality of vehicles is needed to be analyzed and there are varying degrees of driving skills depending on drivers. Therefore, it is not easy to specify the dangerous curved road by performing the method. In the case of image analysis, it is possible to specify the deteriorated portion 50 from one captured image.

The specifying unit 26 specifies the deteriorated portion 50 of the lane marking in comparison with other lane markings included in the captured image. For example, the specifying unit 26 specifies the deteriorated portion 50 of the first lane marking 40 shown in FIG. 1 in comparison with the second lane marking 42 or the central lane marking 44. The specifying unit 26 compares sections of the lane markings with each other and determines that deterioration occurs when the difference between the average pixel values is greater than or equal to a predetermined value. In this way, the deteriorated portion 50 can be specified by comparing a plurality of lane markings included in one captured image.

In another specifying method, the specifying unit 26 may specify the deteriorated portion 50 of the lane marking by using past lane marking data. The receiving unit 24 may receive past lane marking data stored by the server device 12 every week, for example, or may receive the past lane marking data corresponding to the route from the server device 12 at the time of starting route guidance. The lane marking data transmitted from the server device 12 may be any of a feature amount of the lane marking, image data of the lane marking, and an index indicating the degree of deterioration of the lane marking. The past lane marking data has been acquired during past vehicle travel, and is used as comparison data for specifying a deteriorated lane marking. Here, a method for specifying a deteriorated portion of a lane marking will be described with reference to a new figure.

Figure 3:
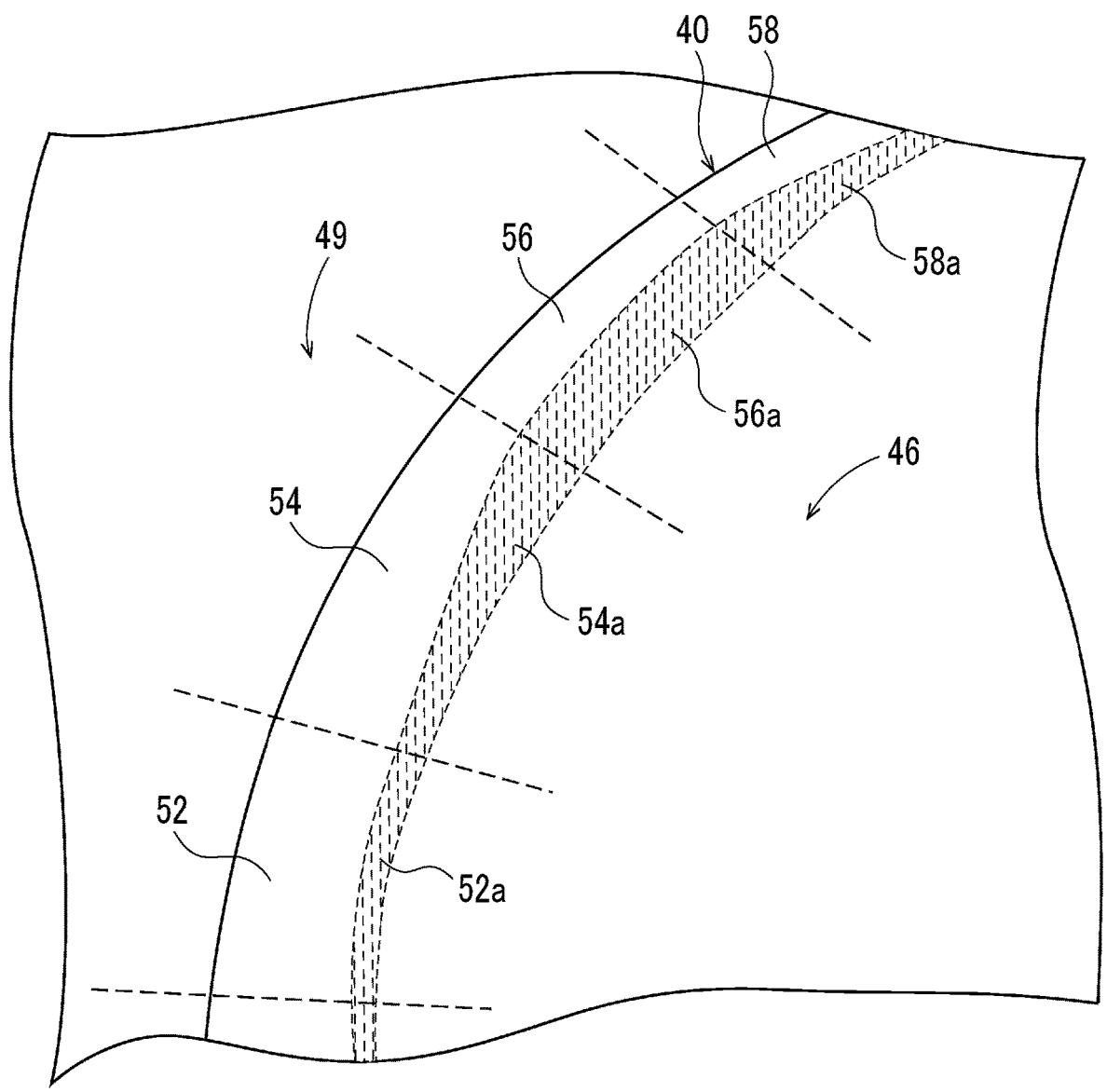
FIG. 3 is an enlarged diagram of a first lane marking for describing a method for specifying a deteriorated portion of the lane marking.

FIG. 3 is an enlarged diagram of a first lane marking 40 for describing a method for specifying a deteriorated portion of the lane marking. The specifying unit 26 divides the first lane marking 40 at predetermined intervals in the longitudinal direction, and derives the degree of deterioration for each of sections of the first lane marking 40. The first lane marking 40 illustrated in FIG. 3 is divided into a first section 52, a second section 54, a third section 56, and a fourth section 58. The first section 52, the second section 54, the third section 56, and the fourth section 58 are deteriorated, and have deteriorated portions 52a, 54a, 56a, 58a on the roadway side. The predetermined interval of each section may be set to about 0.3 meter to 1 meter.

The specifying unit 26 extracts the first lane marking 40 from the captured image, and derives the degree of deterioration for each section based on each section of the first lane marking 40 and the lane marking data to be compared. The first lane marking 40 is extracted from the captured image by using the positional relationship between the second lane marking 42 and the central lane marking 44 and data on the belt shape stored in advance.

The lane marking data to be compared includes, for example, the second lane marking 42 and the central lane marking 44 extracted from the same captured image as the first lane marking 40, the past data on the first lane marking 40 received by the receiving unit 24, and reference data stored in advance. The specifying unit 26 compares a plurality of lane markings included in the same captured image and derives the degree of deterioration of the first lane marking 40. In this way, it is possible to specify the deteriorated place of the lane marking on the same road, that is, specify the place where the vehicle is likely to stick out of the first roadway 46.

The specifying unit 26 compares the average pixel value of the sections of the first lane marking 40 with the average pixel value of the predetermined region of the second lane marking 42 or the central lane marking 44, and specifies that, among the first section 52 to the fourth section 58, the third section 56 is deteriorated most. The lane markings to be compared have the same color. For example, the specifying unit 26 does not compare the white lane marking with the yellow lane marking. The white lane marking is peeled off as it is deteriorated and is close to black since the color thereof is mixed to the color of the road surface. The derivation may be made such that the degree of deterioration increases as the difference in average pixel values between the third section 56 and the predetermined region of the other lane markings increases. When the degree of deterioration of the lane marking is derived in comparison with other lane markings included in the same captured image, the degree indicates how the vehicle is likely to stick out of the first roadway 46. In addition, when the average pixel value of sections of the lane markings is compared, luminance correction according to the perspective difference or luminance correction according to the presence or absence of a shadow may be made.

The specifying unit 26 derives the degree of deterioration of each section of the first lane marking 40 based on the pixel value of each section of the first lane marking 40 and the past data on the first lane marking 40 received by the receiving unit 24. Thereby, determination can be made whether the section is deteriorated from the first lane marking 40 detected previously. When the difference between the average pixel value of the sections of the first lane marking 40 and the past data on the first lane marking 40 is equal to or greater than a predetermined value, the specifying unit 26 may transmit the information on the first lane marking 40 to the server device 12. That is, the specifying unit 26 does not transmit the information on the first lane marking 40 unless the first lane marking 40 is deteriorated so much as compared to the past data, and transmits the information on the first lane marking 40 to the server device 12 when the first lane marking 40 is deteriorated from the past data to or above a predetermined value. Thereby, it is possible to suppress transmission of the information on the first lane marking 40 with a small amount of change from the past data on the lane marking to the server device 12, and to reduce the amount of data transmitted to the server device 12 from the in-vehicle terminal 10. Further, in comparison with past data, it is possible to specify the deterioration speed of the lane marking for each section.

The specifying unit 26 may specify a deteriorated portion of the first lane marking 40 by comparing pixel values of sections of the first lane marking 40. When the first lane marking 40 is partially deteriorated, the specifying unit 26 can specify the deteriorated portion by using just the first lane marking 40.

For example, the specifying unit 26 may derive the degree of deterioration of each of sections of the first lane marking 40 with an index of 10 levels. In the 10-level evaluation, the degree of deterioration of level 10 indicates the state of being most deteriorated, which refers to the state where the first lane marking 40 is almost invisible, and degree of deterioration of level 1 indicates that the first lane marking 40 is in the newest state. The specifying unit 26 derives the degree of deterioration of each of sections of the first lane marking 40 based on the reference data on the lane markings stored in advance and the pixel value of each of sections of the first lane marking 40.

The specifying unit 26 may specify the deteriorated portion 50 depending on whether the shape of the first lane marking 40 is a belt shape having a certain width. The specifying unit 26 compares the image data of the first lane marking 40 with the lane marking model data to determine whether the shape is kept in a belt shape, and specifies, as the deteriorated portion 50, a portion that is not kept in the belt shape. The lane marking model data may be formed in a belt shape having a certain width and hold a plurality of patterns. The lane marking model data is deformed based on the road surface shape included in the captured image and the curvature of other lane markings according to the perspective method. The specifying unit 26 determines whether or not the edge of the first lane marking 40 extends uniformly, and specifies, as the deteriorated portion 50, a portion where the edge of the first lane marking 40 is not uniform.

Returning to FIG. 2, the information on the deteriorated portion 50 of the lane marking specified by the specifying unit 26 is transmitted from the in-vehicle terminal 10 to the server device 12. Thereby, the server device 12 can accumulate information on deteriorated portion 50 of the lane marking. The information on the deteriorated portion 50 of the lane marking includes information indicating the degree of deterioration, position information of the deteriorated portion 50, and position information acquisition time. The position information of the deteriorated portion 50 may be derived from the distance from the vehicle to the deteriorated portion 50, which is calculated from the captured image, and the position information of the vehicle at the time of image capturing.

The holding unit 30 of the server device 12 accumulates information on the deteriorated portion 50 of the lane marking transmitted from the in-vehicle terminal 10 and holds the deterioration history of the lane marking for each lane marking. The map acquiring unit 32 acquires map information and provides it to the deriving unit 34.

The deriving unit 34 derives caution point on the road based on the deterioration history of the lane marking. The deriving unit 34 derives a section as a caution point when the deterioration history of the section of the lane marking indicates that the section more quickly deteriorates to or beyond a predetermined reference value than other lane markings on the same road. When the degree of deterioration of each of sections of the lane marking changes quickly to or over the reference value, the deriving unit 34 derives the section as a caution point. By deriving a caution point that deteriorates quickly based on the deterioration history of the lane marking, it is possible to specify a place where the vehicle is likely to stick out of the roadway, and alert the vehicle or pedestrian passing through the place.

When the caution point is derived, the deriving unit 34 may use the behavior information of the vehicle in addition to the deterioration history of the lane marking. For example, the deriving unit 34 extracts information on a curved road where skidding is likely to occur based on the behavior information of the vehicle, and derives a caution point on the road based on the deterioration history of the lane marking provided on the extracted curved road.

Hereinabove, the disclosure has been described based on the embodiment and examples. The disclosure is not limited to thereto, and various modifications such as design changes can be added based on the knowledge of those skilled in the art.

In the embodiment, a mode in which the captured image is analyzed by the specifying unit 26 on the in-vehicle terminal 10 is shown, but the disclosure is not limited thereto, and the server device 12 may analyze the captured image. That is, the configuration of the specifying unit 26 on the in-vehicle terminal 10 is provided in the server device 12. The server device 12 specifies a deteriorated portion of the lane marking from the captured image, and holds it in association with the position information of the vehicle. Regardless of whether the in-vehicle terminal 10 or the server device 12 performs image processing, information on the deteriorated portion of the lane marking is accumulated in the server device 12.

What is claimed is:

1. A system for specifying a lane marking deterioration, comprising:

an image acquiring unit comprising a lens configured to acquire a captured image of an outside of a vehicle; and
a processor configured to:
extract a lane marking on a road surface included in the captured image and specify a deteriorated portion of the lane marking, wherein the processor is provided to an in-vehicle terminal;
derive a degree of deterioration of the deteriorated portion of the lane marking based on a pixel value of each section of the lane marking and past data on the lane marking;
in response to determining that the degree of deterioration is equal to or greater than a predetermined value, transmit information on the lane marking from the in-vehicle terminal to the server; and in response to determining that the degree of deterioration is less than the predetermined value, not transmit information on the lane marking to the server.

2. The system according to claim 1, wherein the processor is configured to specify the deteriorated portion of the lane marking in comparison with another lane marking included in the captured image.

3. The system according to claim 1, further comprising:
a receiving unit configured to receive past lane marking data of a road included in the captured image, wherein;
the processor is configured to specify, from the captured image, a deteriorated portion of the lane marking that has deteriorated from the past lane marking data.

4. The system according to claim 1, wherein the processor is further configured to:
accumulate the information on the deteriorated portion of the lane marking specified by the processor and store a deterioration history of the lane marking; and
derive a caution point on the road based on the deterioration history of the lane marking.

5. A method for specifying a lane marking deterioration, the method comprising:
acquiring a captured image of an outside of a vehicle;
extracting, via a processor provided to an in-vehicle terminal, a lane marking on a road surface included in the captured image and specifying a deteriorated portion of the lane marking;
deriving a degree of deterioration of the deteriorated portion of the lane marking based on a pixel value of each section of the lane marking and past data on the lane marking;
in response to determining that the degree of deterioration is equal to or greater than a predetermined value, transmitting information on the lane marking from the in-vehicle terminal to the server; and
in response to determining that the degree of deterioration is less than the predetermined value, not transmitting information on the lane marking to the server.

\* \* \* \* \*